United States Patent [19]

Hendrickson et al.

[11] 4,333,668
[45] Jun. 8, 1982

[54] ELECTRONIC ADAPTIVE RIDE CONTROL SYSTEM

[75] Inventors: Richard T. Hendrickson; Joel S. Carter, both of South Bend, Ind.

[73] Assignee: The Bendix Corporation, Southfield, Mich.

[21] Appl. No.: 104,326

[22] Filed: Dec. 17, 1979

[51] Int. Cl.³ .............................................. B60G 21/00
[52] U.S. Cl. .................... 280/703; 280/707; 280/709
[58] Field of Search ............... 280/703, 707, 708, 709, 280/112 A, 689

[56] References Cited

U.S. PATENT DOCUMENTS

| | | | |
|---|---|---|---|
| 2,882,592 | 4/1959 | Bourcier De Carbon | 29/434 |
| 2,901,239 | 8/1959 | Sethna | 267/8 |
| 3,047,283 | 7/1962 | Kivell | 267/9 |
| 3,365,033 | 1/1968 | Willich | 188/88 |
| 3,399,882 | 9/1968 | Hausmann | 267/64 |
| 3,844,544 | 10/1974 | Keilholz | 267/64 R |
| 3,869,861 | 3/1975 | Case | 280/708 |
| 3,881,736 | 5/1975 | Wilfert | 280/6.1 |
| 3,938,823 | 2/1976 | Hiruma | 280/703 |
| 3,945,474 | 3/1976 | Palmer | 188/332 |
| 4,054,295 | 10/1977 | Elliott | 280/707 |
| 4,076,275 | 2/1978 | Hiruma | 280/707 |
| 4,159,106 | 6/1979 | Nyman | 267/64 B |
| 4,164,664 | 8/1979 | Kasiewicz | 280/707 |
| 4,168,840 | 9/1979 | Graham | 280/707 |
| 4,185,845 | 1/1980 | Misch | 280/707 |
| 4,238,128 | 12/1980 | McKee | 280/703 |

OTHER PUBLICATIONS

Monroe, 1973 Catalog, Max-4347S-A, pp. 3-8.
"Shocks", Part II by Fredrick James Furrer, *Motor Trend*, Feb. 1977, pp. 82-89.

*Primary Examiner*—Joseph F. Peters, Jr.
*Assistant Examiner*—John A. Carroll
*Attorney, Agent, or Firm*—Paul David Schoenle; Ken C. Decker

[57] ABSTRACT

A vehicle suspension system includes shock absorbers with valves or damping orifices controlled by solenoids. The solenoids are connected to an electronic control unit which is activated in response to a predetermined rate of compression or extension of the shock absorber. A dash-mounted operator control and vehicle attitude sensors for sensing the load, pitch and roll of the vehicle are also connected to the electronic control unit. The electronic control unit energizes the solenoid to control the opening and closing of the valves in response to changes in the vehicle attitude and in response to signals generated by the operator control.

1 Claim, 3 Drawing Figures

1

ELECTRONIC ADAPTIVE RIDE CONTROL SYSTEM

BACKGROUND OF THE INVENTION

This invention relates to suspension systems with automatically and remotely controlled variable damping shock absorbers.

In one type of currently available shock absorbers variable damping is achieved by varying the size of a damping orifice. For example, U.S. Pat. No. 3,399,882 discloses a shock absorber with a gas spring which varies the damping orifice size depending on the compression of the shock absorber. Another type of shock absorber features a tapered metering pin which varies the size of an orifice depending upon the amount of shock absorber compression and extension. Both of these types of shock absorbers have disadvantages in that the damping orifice size cannot be adjusted independent of the amount of shock absorber compression or extension. Other adjustable damping shock absorbers require manual adjustment of the damping orifice at the shock absorber. None of these systems provide a shock absorber which is remotely adjustable, either automatically or manually.

SUMMARY OF THE INVENTION

An advantage of this invention is that it provides a shock absorber, the damping of which may be remotely controlled.

Another advantage of this invention is that is provides means for automatically and manually controlling the damping of a shock absorber.

Accordingly, the present invention includes a shock absorber which transfers fluid between a pair of chambers via a solenoid-controlled orifice in response to relative movement of the vehicle frame and axle. A flow sensor senses the extension or compression of the shock by sensing the flow of fluid through the orifice from one chamber to the other. An electronic control unit receives input signals from the flow sensor, from vehicle attitude sensors, from a load sensor and from an operator control. The control unit generates an output signal as a function of these inputs. The output signal is communicated to the solenoid to control the size of the orifice so that the resistance of the shock to extension and compression may be controlled as a function of shock-absorber movement, of the vehicle attitude and loading and of the operator control.

DETAILED DESCRIPTION

Figure 1:
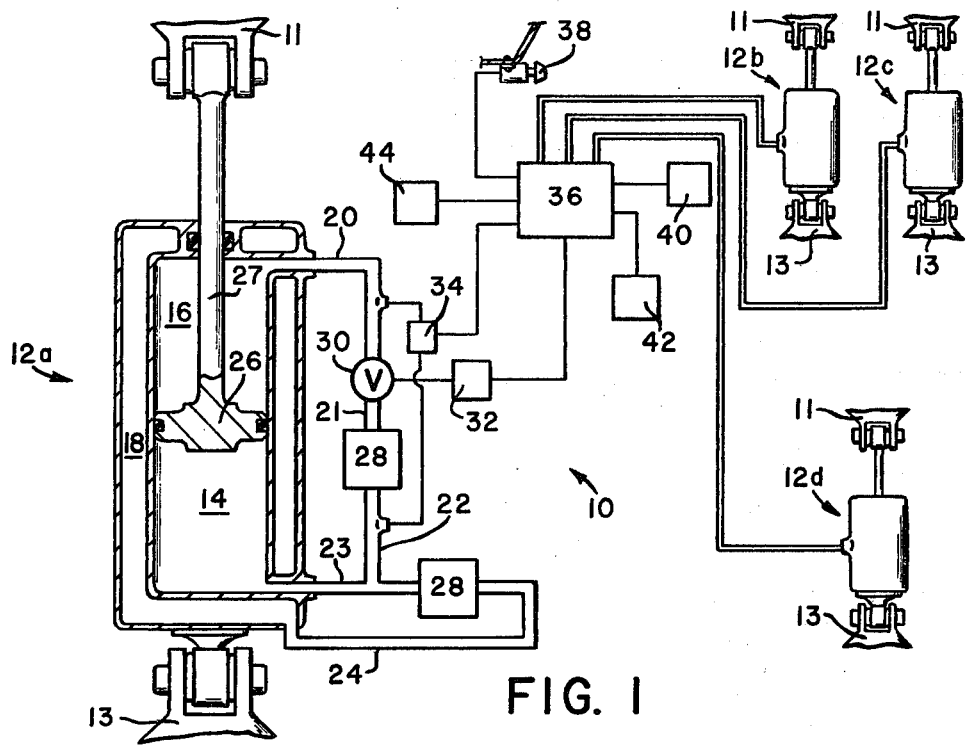
FIGS. 1 and 2 sectionally and schematically illustrate alternate embodiments of applicant's ride control system.

A vehicle suspension system 10, shown in FIG. 1, includes a plurality of identical shock absorbers 12a, 12b, 12c, and 12d, each connected between the sprung and unsprung masses 11 and 13 of an automotive vehicle adjacent the vehicle wheel assembly (not shown). Each shock absorber, such as 12a, includes a pair of fluid-filled chambers 14 and 16 and a fluid reservoir 18 interconnected by passages 20, 21, 22, 23, and 24. Fluid is transferred between the chambers 14 and 16 and the reservoir 18 in response to the movement of piston 26. Rod 27 connects piston 26 to the sprung mass 11. Reservoir 18 receives excess fluid displaced by rod 27. Staged valves 28, such as multi-staged piston velocity sensitive valves which are found in currently available off-the-shelf shock absorbers, resist the flow of fluid between chambers 14, 16, and reservoir 18 to thereby dampen the motion of piston 26 in a manner well known in the shock absorber art. A normally open valve 30 connected between passages 20 and 21 may be closed by a solenoid 32 connected to it. A flow sensor 34 senses the flow of fluid between chambers 14, 16, and reservoir 18 of shock absorber 12a by sensing the fluid pressure differential between passages 20 and 22. A flow sensor 34 at each shock absorber 12 a-d generate D.C. voltage flow signals F1, F2, F3, and F4, respectively, when the rate of fluid flow and the resulting pressure differential is greater than a predetermined amount. Flow signals F1 through F4 are communicated to an electronic control unit (ECU)36, for which a more detailed description follows shortly.

The suspension system 10 also includes a dash-mounted operator ride control 38 which generates an operator ride control signal SR, the d.c. voltage of which is proportional to the stiffness of ride desired by the vehicle operator. A load sensor 40 generates a load signal SL, the d.c. voltage of which is proportional to the vehicle loading. A pitch sensor 42 generates d.c. voltage front and rear pitch signals PF, PR proportional to the forward or rearward pitch of the vehicle. A roll sensor 44 generates d.c. voltage left and right roll signals RL, RR proportional to the leftward or rightward roll of the vehicle.

Figure 2:
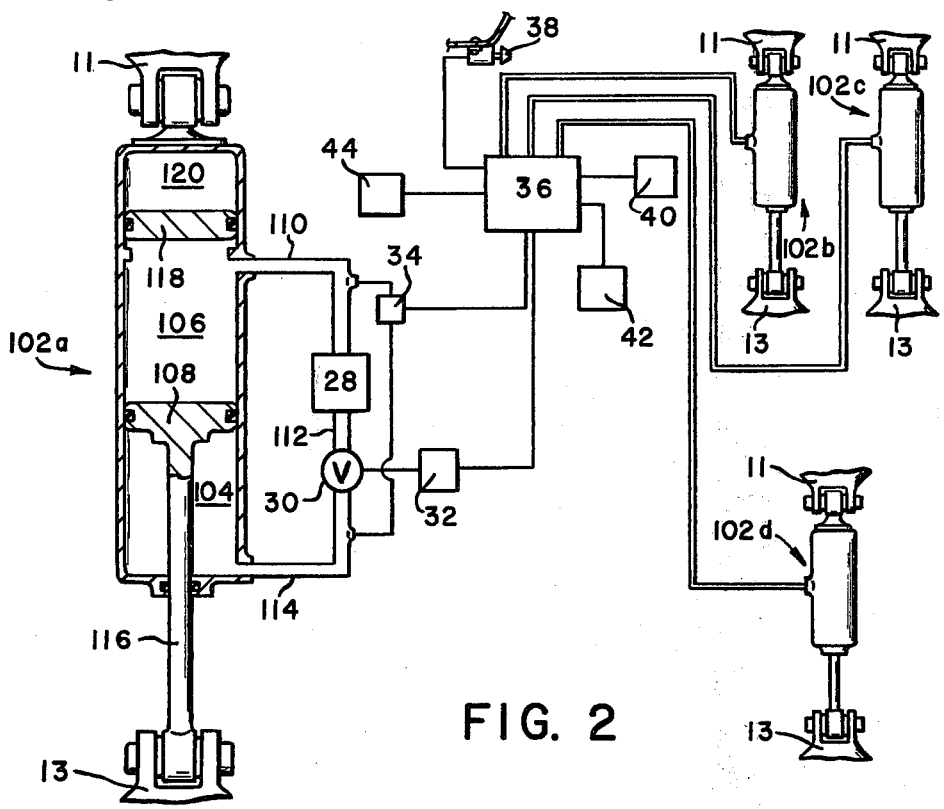

In an alternate embodiment illustrated in FIG. 2, each of identical shock absorbers 102a-d, includes a pair of fluid-filled chambers 104 and 106 separated by piston 108 and interconnected by passage 110, staged valve 28, passage 112, normally open valve 30 and passage 114. Rod 116 connects piston 108 to the unsprung mass 13. A movable diaphragm 118 separates fluid-filled chamber 106 from a gasfilled chamber 120. Diaphragm 118 moves to expand or compress chamber 120 to compensate for the volume of fluid displaced by rod 116.

Figure 3:
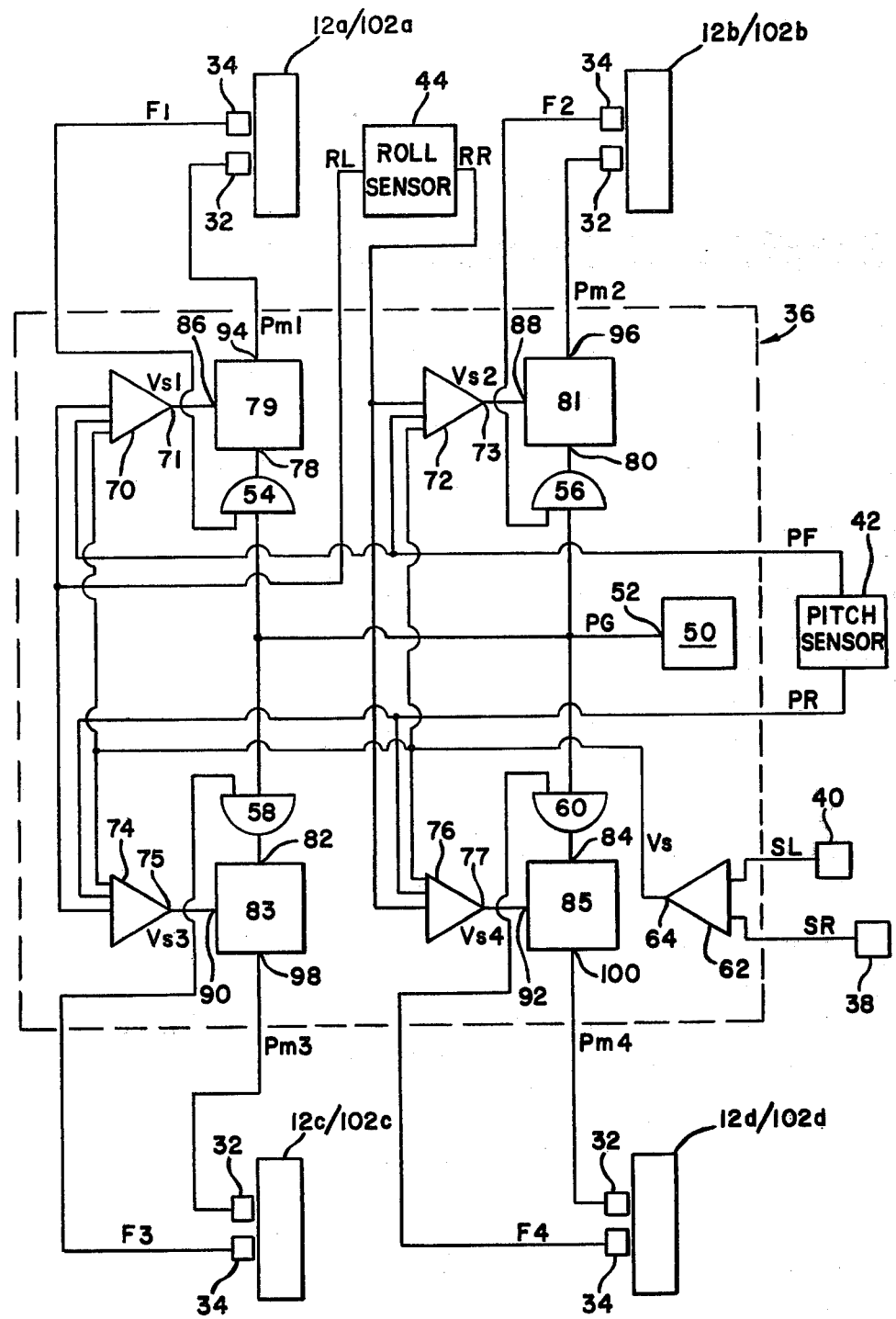
FIG. 3 is a schematic view of applicant's electronic control unit.

Referring now to FIG. 3, the ECU 36 includes a pulse generator 50 which generates, at output terminal 52 thereof, a train of constant width pulses Pg with a fixed amplitude and repetition rate. Output terminal 52 is connected to an input terminal of each of AND gates 54, 56, 58, and 60. A primary analog summer 62 receives the operator ride control signal SR and the load control signal SL and generates a voltage Vs at terminal 64 which is proportional to the sum of the voltages of signals SR and SL. Terminal 64 of summer 62 is connected to an input of each of secondary analog summers 70, 72, 74, and 76. Flow signals F1, F2, F3, and F4 are applied to the other input of each of AND gates 54, 56, 58, and 60, respectively, so that the output of the respective AND gate is inhibited unless the voltage of the respective flow signal, and therefore the fluid flow is greater than a predetermined amount.

The left roll signal RL is applied to input terminals of secondary summers 70 and 74. The right roll signal RR is applied to input terminals of secondary summers 72 and 74. The front pitch signal PF is applied to input terminals of secondary summers 70 and 72, and the rear pitch signal PR is applied to input terminals of secondary summers 74 and 76. Secondary summer 70 generates an output signal Vs1 at output terminal 71 thereof, the voltage of output signal Vs1 being proportional to the sum of voltages Vs and of the voltages of the left roll signal R1 and the front pitch signal PF. In a similar manner, secondary summers 72, 74, and 76 generate output signals Vs2, Vs3, and Vs4 at output terminals 73, 75, and 77, thereof, the output signals being proportional to the sum of the voltages of the signals applied to the input terminals of the respective secondary summer.

The output terminals of AND gates 54, 56, 58, and 60 are connected to the pulse input terminals 78, 80, 82, and 84 of pulse width modulators 79, 81, 83, and 85, respectively. The secondary summer output terminals 71, 73, 75, and 77 are connected to the control input terminals 86, 88, 90, and 92 of pulse width modulators 79, 81, 83, and 85, respectively. Pulse width modulators 79, 81, 83, and 85 generate output signals Pm1, Pm2, Pm3, and Pm4 at respective output terminals 94, 96, 98, and 100 thereof, unless the output of the respective AND gate is inhibited as described previously. Each output signal Pm1-4 is a train of pulses with a constant amplitude and repetition rate, but with a variable pulse width or duration which is proportional to the voltage applied to the respective control input terminals 86, 88, 90, and 92 of pulse width modulators 79, 81, 83, and 85. Pulse width modulator output terminals 94, 96, 98, and 100 are each connected to a respective one of the solenoids 32 which control the closing of valves 30 in shock absorbers 12a-d or 102a-d.

MODE OF OPERATION

The similarities between the systems shown in FIGS. 1 and 2 are such that a description of the operation of either one, along with the operation of the control unit 36 of FIG. 3, will suffice. Similarly, with respect to FIGS. 2 and 3, a description of the operation of shock absorber 102a is sufficient for an understanding of the entire system. Now, assume that the vehicle ignition (not shown) is switched on so that electrical power is fed to the control unit 36. Pulse generator 50 generates a fixed frequency pulse train Pg with pulses of constant amplitude and duration. The pulse train Pg is communicated to an input terminal of AND gate 54. Also, assume that shock absorber 102a is at rest, or is being compressed or extended at a rate which is slower than a predetermined rate. At this low rate of movement only a low pressure differential is developed across staged valve 28 and no flow signal F1 is generated by flow sensor 34. The absence of flow signal F1 inhibits the output of AND gate 54 and no pulse train is communicated to the pulse input terminal 78 of pulse width modulator 79. As a result, no signal is generated at output terminal 94 of modulator 79. Solenoid 32 responds to the absence of a signal at terminal 94 by allowing normally open valve 30 to remain open. Thus, the only shock absorber motion damping is provided by staged valve 28 which provides shock absorber 102a with its "soft" ride characteristic during low rates of extension and compression.

Now, assume that movement of the vehicle causes compression or extension of shock absorber 102a at a rate greater than the predetermined rate. This motion causes flow sensor 34 to generate flow signal F1, which is communicated to an input terminal of AND gate 54. Enabled by flow signal F1, the pulse train Pg now appears at the output of AND gate 54 and is communicated to the pulse input terminal 78 of pulse width modulator 79. Modulator 79 responds by generating a modulated pulse train Pm1 at output terminal 94. Solenoid 32 responds by closing normally open valve 30 for the duration of each pulse of pulse train Pm1 to increase the resistance of shock absorber 102a to compression or extension by increasing its resistance to fluid flow.

As previously described, summers 62 and 70 cooperate to generate an output voltage signal Vs1, the voltage of which is proportional to the sum of the voltages of the operator ride control signal SR, the load signal SL, the left roll signal RL and the front pitch signal PF. The pulse width modulator 79 responds to increases in the voltage of signal Vs1 by increasing the duration or width of the pulses of pulse train Pm1. This increased pulse duration increases the proportion of time during which normally open valve 30 is closed by solenoid 32 to thereby increase the resistance of shock absorber 102a to compression or extension. It should be noted that an increase in any one of voltage signals SL, SR, RL, and PF, or an increase in the voltage of any combination thereof, results in an increased voltage Vs1, and thus, in the damping of shock absorber 102a. In this manner, the applicant's ride control system automatically adjusts individual shock absorber resistance to changes in vehicle pitch and roll. Since the output signal Vs of primary summer 62 is communicated to each of secondary summers 79, 81, 83, and 85, the ride control system automatically and simultaneously adjusts the resistance of all the shock absorbers 102a-d to changes in vehicle loading. Finally, by adjusting the voltage of operator ride control signal SR, the vehicle operator may simultaneously adjust the resistance of all the shock absorbers 102a-d according to the firmness of ride desired by the operator.

I claim:

1. An electronic adaptive ride control system for an automotive vehicle having sprung and unsprung masses, said system comprising an adjustable shock absorber for resisting the relative motion of said sprung and unsprung masses of said vehicle, said shock absorber comprising a pair of variable-volume chambers between which fluid is communicated in response to relative motion of said sprung and unsprung masses, variable fluid flow resistance means for adjusting the motion resistance of said shock absorber by interrupting said fluid communication independent of the relative position of said masses, in response to control signals generated by a control unit of said system;

said variable fluid flow resistance means comprising valve means for opening and closing said fluid communication between said pair of chambers, and servo means operatively coupled to said valve means for controlling the opening and closing of the valve means in response to said control signals;

said shock absorber also comprising pumping means defining said pair of variable-volume chambers for pumping viscous fluid through the valve means in response to relative motion of the masses;

a housing connected to one of the masses;

a rod connected to the other of the masses;

a piston connected to the rod and cooperating with the housing to define said pair of chambers for containing viscous fluid therewithin, the piston being movable relative to the housing to transfer fluid between said chambers and through said valve means in response to relative movement of the masses;

said housing, said rod, and said piston cooperating to define said pumping means; and said shock absorber further comprising a passage disposed outwardly of the housing and communicating said pair of chambers with each other, said passage receiving said valve means whereby fluid communication through said passage is varied in response to said control signals.

* * * * *